United States Patent
Brown, Jr.

(10) Patent No.: US 6,868,358 B2
(45) Date of Patent: Mar. 15, 2005

(54) METHOD FOR PROCESSING INFORMATION IN A TIRE PRESSURE MONITORING SYSTEM

(75) Inventor: Jack Edward Brown, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 182 days.

(21) Appl. No.: 10/320,799

(22) Filed: Dec. 16, 2002

(65) Prior Publication Data

US 2004/0017289 A1 Jan. 29, 2004

Related U.S. Application Data

(60) Provisional application No. 60/398,210, filed on Jul. 24, 2002.

(51) Int. Cl.[7] .............................................. B60C 23/00
(52) U.S. Cl. ........................... 702/138; 701/29; 701/35; 73/146; 73/146.5; 340/442
(58) Field of Search ............................ 702/138; 73/146, 73/146.5; 340/442, 443, 444, 445, 447; 701/29, 35

(56) References Cited

U.S. PATENT DOCUMENTS

| | | | |
|---|---|---|---|
| 4,866,419 A | 9/1989 | Kyrtsos et al. | 340/553 |
| 4,909,074 A | 3/1990 | Gerresheim et al. | 73/146.4 |
| 5,285,189 A | 2/1994 | Nowicki et al. | 340/447 |
| 5,353,020 A | 10/1994 | Schurmann | 340/870.31 |
| 5,517,853 A | 5/1996 | Chamussy | 73/146.3 |
| 5,531,574 A | 7/1996 | Lowe et al. | 340/447 |
| 5,721,374 A | 2/1998 | Siekkinen et al. | 73/146.2 |
| 5,721,528 A | 2/1998 | Boesch et al. | 340/442 |

(List continued on next page.)

FOREIGN PATENT DOCUMENTS

| | | | | |
|---|---|---|---|---|
| DE | 4331845 A1 | 4/1994 | | B60C/23/00 |
| DE | 4339970 A1 | 6/1994 | | B60C/23/00 |
| DE | 19749347 A1 | 5/1998 | | G08C/17/02 |
| DE | 19924830 A1 | 11/2000 | | B60C/23/20 |
| GB | 2271209 A | 10/1992 | | B60C/23/00 |
| WO | WO 99/29522 | 6/1999 | | B60C/23/04 |
| WO | WO 99/52723 | 10/1999 | | B60C/23/04 |
| WO | WO 99/53740 | 10/1999 | | B60C/23/04 |
| WO | WO 01/12452 | 2/2001 | | B60C/23/04 |
| WO | WO 01/12453 | 2/2001 | | B60C/23/06 |
| WO | WO 01/17806 | 3/2001 | | B60C/23/04 |
| WO | WO 01/36220 | 5/2001 | | B60C/23/04 |
| WO | 0143997 | 6/2001 | | B60C/23/04 |

OTHER PUBLICATIONS

Internet site www.sensormag.com entitled A Smart Tire Pressure Monitoring System from Motorola Semiconductor, Sensor Products Division dated Nov. 2001.

*Primary Examiner*—John Barlow
*Assistant Examiner*—Hien Vo
(74) *Attorney, Agent, or Firm*—Richard B. O'Planick

(57) ABSTRACT

A method of processing information in a tire pressure monitoring system includes the steps of: establishing a reference temperature; determining a pressure warning threshold at the reference temperature; measuring gauge pressure and gauge temperature within a tire cavity; correcting the gauge pressure to a filtered pressure value at the reference temperature using the Ideal Gas Law; and comparing the filtered pressure value against the pressure warning threshold to determine the necessity for a warning signal. In an advanced form of the invention, the method includes determining a pressure leak rate; predicting the time interval that the filtered pressure value will cross the pressure warning threshold at the leak rate and generating progressive warnings to the driver over the time interval. Fuzzy logic is used to quantify the probability of a warning state for each data point, allow for measurement error; and report the state of maximum probability to minimize the occurrence of false warning. A warning utility function is derived based upon a combination of the filtered pressure and leak rate.

19 Claims, 12 Drawing Sheets

U.S. PATENT DOCUMENTS

| | | |
|---|---|---|
| 5,760,682 A | 6/1998 | Liu et al. .................... 340/444 |
| 5,783,992 A | 7/1998 | Eberwine et al. ........... 340/445 |
| 5,825,286 A | 10/1998 | Coulthard ................... 340/447 |
| 5,827,957 A | 10/1998 | Wehinger ................... 73/146.3 |
| 5,886,624 A | 3/1999 | Hebert ....................... 340/442 |
| 5,895,846 A | 4/1999 | Chamussy et al. ......... 73/146.2 |
| 5,900,809 A | 5/1999 | Hebert ....................... 340/442 |
| 5,939,977 A | 8/1999 | Monson ...................... 340/442 |
| 5,963,128 A | 10/1999 | McClelland ................ 340/447 |
| 6,002,327 A | 12/1999 | Boesch et al. .............. 340/442 |
| 6,092,415 A | 7/2000 | Borenius et al. ........... 73/146.2 |
| 6,118,369 A | 9/2000 | Boesch ....................... 340/443 |
| 6,144,295 A | 11/2000 | Adams et al. .............. 340/442 |
| 6,259,360 B1 | 7/2001 | Takamura ................... 340/445 |
| 6,278,363 B1 | 8/2001 | Bezek et al. ................ 340/442 |
| 6,281,787 B1 | 8/2001 | Lerg et al. .................. 340/442 |
| 6,292,095 B1 | 9/2001 | Fuller et al. ................ 340/442 |
| 6,292,096 B1 | 9/2001 | Munch et al. .............. 340/445 |
| 6,362,731 B1 | 3/2002 | Lill ............................ 340/445 |
| 2002/0084896 A1 | 7/2002 | Dixit et al. ................. 340/447 |

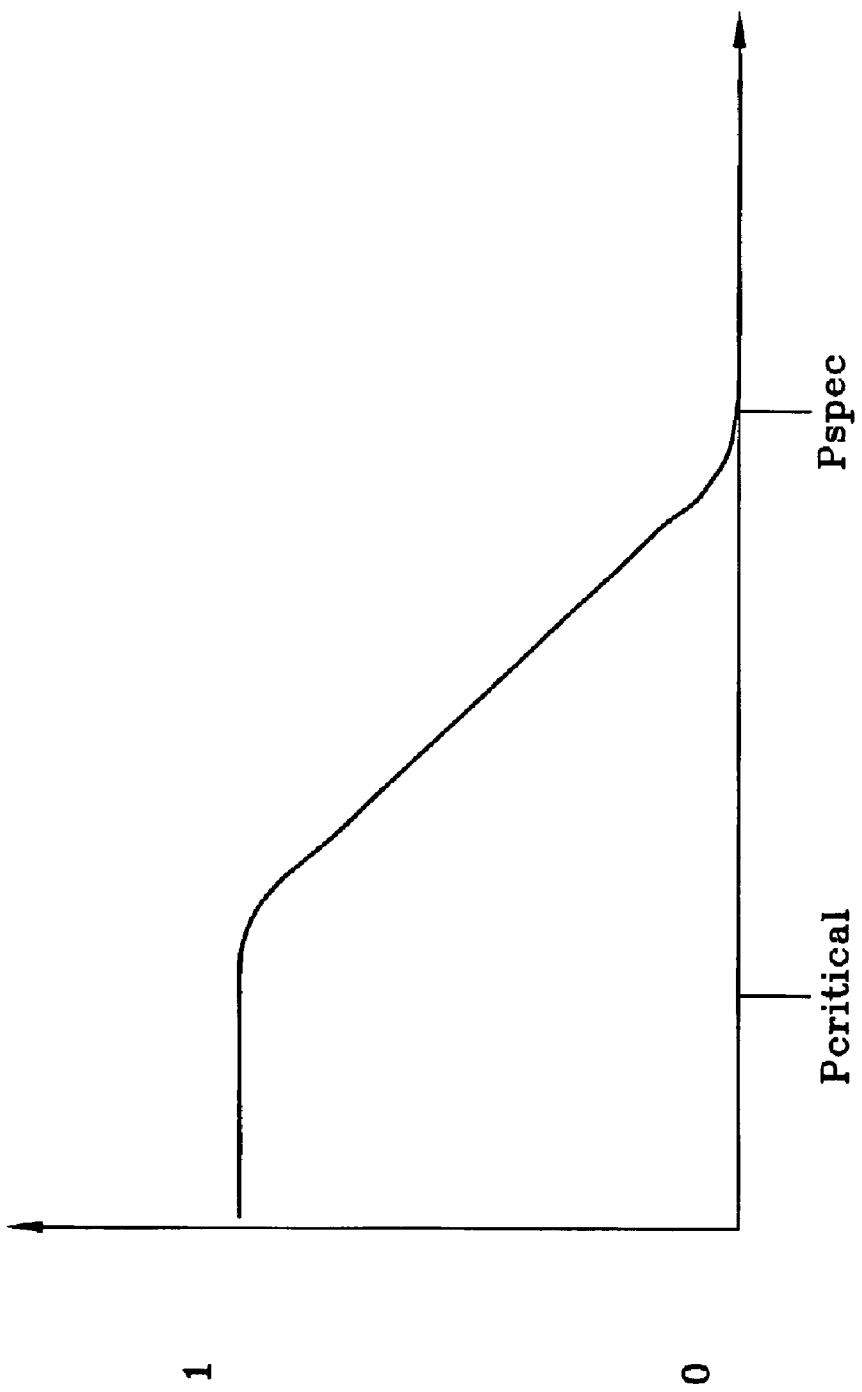

METHOD FOR PROCESSING INFORMATION IN A TIRE PRESSURE MONITORING SYSTEM

This application claims benefit to U.S. Provisional Application 60/398,210 filed on Jul. 24, 2002.

FIELD OF THE INVENTION

The invention relates generally to tire monitoring and warning systems and, in particular, to a method for processing measurements of tire cavity pressures and temperatures to warn of pressure leakage, low inflation conditions, or excessive temperature over a range of speeds and loads.

BACKGROUND OF THE INVENTION

It is well documented that maintaining a correct tire pressure improves handling, increases gas mileage, and extends the useful life of vehicle tires. Moreover, maintaining a correct tire pressure is an important consideration to the safe operation of a vehicle. Despite its irrefutable importance, tire pressure may not be monitored and maintained frequently enough by many in the driving public. Even well maintained tires may undergo a loss of pressure during the operation of a vehicle after sustaining damage, creating a potentially hazardous situation to the operator. In addition, with the advent of "extended mobility tires" (EMT) and their increasingly widespread commercial presence, it may be difficult for a vehicle operator to detect a low pressure or leak condition and take appropriate action. As a result, extended use of a tire in a low pressure condition beyond the manufacturer's recommended limit may occur.

Various legislative approaches requiring the communication of tire pressure information to the operator of a vehicle have been proposed, including a mandate that new vehicles be equipped with a low tire pressure monitoring system. Consequently, a need exists for systems that generate temperature and pressure measurements of each tire on a vehicle under various loads and conditions and methods for analyzing and interpreting the measured data so as to warn drivers in an accurate and timely manner when undesired low pressure, high temperature, and/or pressure leakage is detected.

Consequently, tire pressure monitoring systems have been developed and are in limited use. Such systems typically comprise a sensor located in the tire to perform real-time interior air pressure and temperature monitoring. The information is wirelessly transmitted to the driver via radio band frequencies (RF) and displayed in the driver compartment of the vehicle. The remote sensing module consists of a pressure sensor, a temperature sensor, a signal processor, and an RF transmitter. The system may be powered by a battery or the sensing module may be "passive"; that is, power may be supplied to the sensing module by way of magnetic coupling with a remote transmitter. The receiver can either be dedicated to tire pressure monitoring or share other functions in the car. For instance the receiver controller could be the existing dashboard controller or the body controller. The receiver itself may further be shared with other systems using the same frequency range such as a remote keyless entry system.

The purpose of a tire monitoring system is to provide the driver with a warning should an anomaly occur in one or more tires. Typically tire pressure and temperature are reported parameters. To be useful, the information must be quickly communicated and be reliable. However, displaying data derived from raw sensor measurement of temperature and pressure is not always sufficient to accurately represent the status of a tire at any given time and at various loads and conditions. The interpretation of measured data relating to temperature and pressure, therefore, is critical, but has heretofore been problematic. Temperature and pressure readings by sensors in communication with a tire under conditions of actual use are influenced by various factors including heat emitted by the brakes; the thermal dissipation from the tire to the rim; load transfers that cause slight variations of the volume of the tires; and heat build up in the tire due to its hysteretic losses. Such factors can affect the accuracy of information communicated to the driver, failing to alert the driver of marginal tire conditions under some circumstances and issuing false alarms to the driver in other instances.

Consequently, a need exists for processing information in a tire pressure monitoring system in an accurate and timely manner. The desired interpretive framework should be robust, founded upon sound methodology, and providing a high degree of versatility. Various types of sensors are available for pressure detection, including piezoelectric sensors, electronic sensors, carbon sensors, bolometer sensors, optical reflection sensors, capacitive sensors, inductive sound sensors, and ultrasonic sensors. The interpretive methodology, therefore, should be capable of utilization with and be independent of sensor, communication, and data processing hardware so as to find application in the wide range of monitoring systems in use today. Moreover, the interpretive methodology should require a relatively small amount of computer processing memory to further lower the associated hardware cost. Fundamentally, the interpretative methodology should deliver timely and accurate information to the driver necessary to maintain tire safety. Optimally, the system would provide early warning in the case of leakage and different levels of warnings to the driver as the tire condition progressively deteriorates. An acceptable methodology will accurately function in the wide range of environmental conditions such as variable ambient altitude and temperatures, load, and speed that can affect the sensor readings of temperature and pressure within a tire. Equally important, an effective methodology will function in the aforementioned range of environmental conditions while minimizing the occurrence of false alerts.

Several methodologies for processing information in tire monitoring systems have been proposed as attempts to satisfy the recognized needs of the industry. The following patents reflect the state of the art and are hereby incorporated herein by reference in their entireties. U.S. Pat. No. 5,285,189 teaches the inclusion of an inertial switch sensitive to wheel rotation in a pressure warning apparatus. U.S. Pat. No. 5,783,992 discloses a time based low tire pressure warning sensor. U.S. Pat. No. 6,118,369 proposes a tire diagnostic system and method that creates an estimate of pressure loss in a tire based on a combination of time and distance traveled. U.S. Pat. No. 4,866,419 presents a method for detecting an under inflated tire by monitoring a vehicle's suspension. A sonic detector is proposed in U.S. Pat. No. 6,281,787 and logic to determine whether a signal from the detector represents one or more types of tire leaks.

U.S. Pat. No. 5,760,682 discloses a method of processing data to detect a deflated tire wherein speed values for each of four wheels are collected and analyzed for statistical variation that would indicate low tire pressure. Similarly, U.S. Pat. No. 5,721,528 teaches a system and method that determines change in the effective rolling radii of any wheel as an indicator of low tire pressure.

While the systems and methods in the listed prior art function and have met with varying degrees of commercial success, certain shortcomings inherent in each prevent existing methods for processing measurements of tire cavity pressures and temperatures from representing a solution to the needs of the industry. In many systems, the methodology is sensor, data processing hardware, and/or software specific and may not be useful with other types of hardware or systems, thus limiting utility. As previously discussed, it is desirable that any system for processing tire data provide a high degree of standardization and compatibility with systems in commercial use. Secondly, many of the existing methods of evaluating tire measurement data are susceptible to generating and conveying false alarms that erroneously indicate a low pressure situation. Existing systems and methods, in short, are vulnerable to aberrant sensor readings due to load, temperature, and environmental conditions. Many methods of interpreting tire measurement data also lack the capability for providing users with a calculation of the rate of leakage and advance warning as to when the pressure within a given tire will cross a specified low pressure threshold. Such systems lack the capability of providing different alarms at different levels to a driver. Known methods of interpreting tire measurement data also require substantial data processing memory to store necessary measurement and reference data, adding to system hardware cost.

SUMMARY OF THE INVENTION

The subject invention addresses the need of the industry for a robust method of evaluating cavity pressure and temperature measurements to warn of low inflation condition or excessive temperature over a range of speeds and loads. The Ideal Gas Law is used to derive an equation that facilitates the utilization of measurements of inflation pressure and internal cavity temperature to accurately detect low inflation. Measured data is plotted for multiple inflation pressures, the first of which being an initial pressure at ambient temperature, and the subsequent measurements being over a range of speed and load conditions. The method comprises the steps of sweeping line and polygon over the measured data; fitting the data to a line; and calculating cold inflation pressure and average. A reference temperature, preferably the ambient temperature, is established and at least one warning pressure threshold set at the reference temperature. More than one pressure threshold may be established to provide different alarms at different levels if so desired. Gauge pressure and gauge temperature are measured within a tire cavity and corrected to a filtered pressure value at the reference temperature utilizing equations derived from the Ideal Gas Law. The corrected or filtered pressure value is compared against the pressure warning threshold(s) and one or more alarms are issued in the event that the filtered pressure falls below the warning threshold(s).

In a further embodiment of the subject invention, a probability based algorithm is provided to determine the region on a pressure vs. temperature map that has boundaries determined by the Ideal Gas Law. Steps conforming to the probability based algorithm can be performed on filtered or averaged pressure and temperature data to avoid spurious warnings.

A leak rate model may either be logarithmic or linear with respect to tires. A linear model is used in the preferred embodiment. In yet a further embodiment, a recursive least squares filter is developed, suitable for implementation on a computer chip, in order to fit the pressure data to a linear leak rate model. Subsequent to correcting the pressure and temperature to a reference (e.g. ambient temperature), a leak rate is determined for enhanced warning logic that can be used to warn a vehicle driver. The model parameters are used to forward predict a time period at which the pressure will fall below a specified value. The prediction of time based pressure event can be used to provide advanced warning to the driver so as to enable preventative action. The filter mechanism also includes change detection in order to restart the filter when significant change in the leak rate or pressure occurs.

In yet a further aspect of the invention, the method includes steps in combining the leak rate with an inflation pressure measure into a utility function that is used to decide when to warn the driver. At low values of utility, the warning to the driver is delayed. The driver receives an immediate caution message and a prediction of time to cross a given level is computed and displayed. The level specified may be determined by legislation, industry standards, or vehicle manufacturer practice.

Defined Terminology

P, absolute pressure of a gas, $P=p_0+p_{atm}$

V, volume of the tire internal cavity

T, absolute temperature of a gas in Kelvins (Degrees Celsius+273.16)

n, number of moles of gas in the tire internal cavity

R, the universal gas constant, 8314.472 kpa-cm$^3$/(mol-K)

$p_0$, the cold inflation pressure of the tire at $T_{amb}$ $p_{atm}$, the atmospheric pressure, at standard conditions= 101.325 kpa.

$p_g$, gauge pressure or measured inflation pressure $T_{amb}$, the ambient temperature in Kelvins kpa, kilopascals, a metric unit of pressure kph, speed units in kilometers per hour N, load units in Newtons

BRIEF DESCRIPTIONS OF THE DRAWINGS

The invention will be described by way of example and with reference to the accompanying drawings in which.

Figure 5:
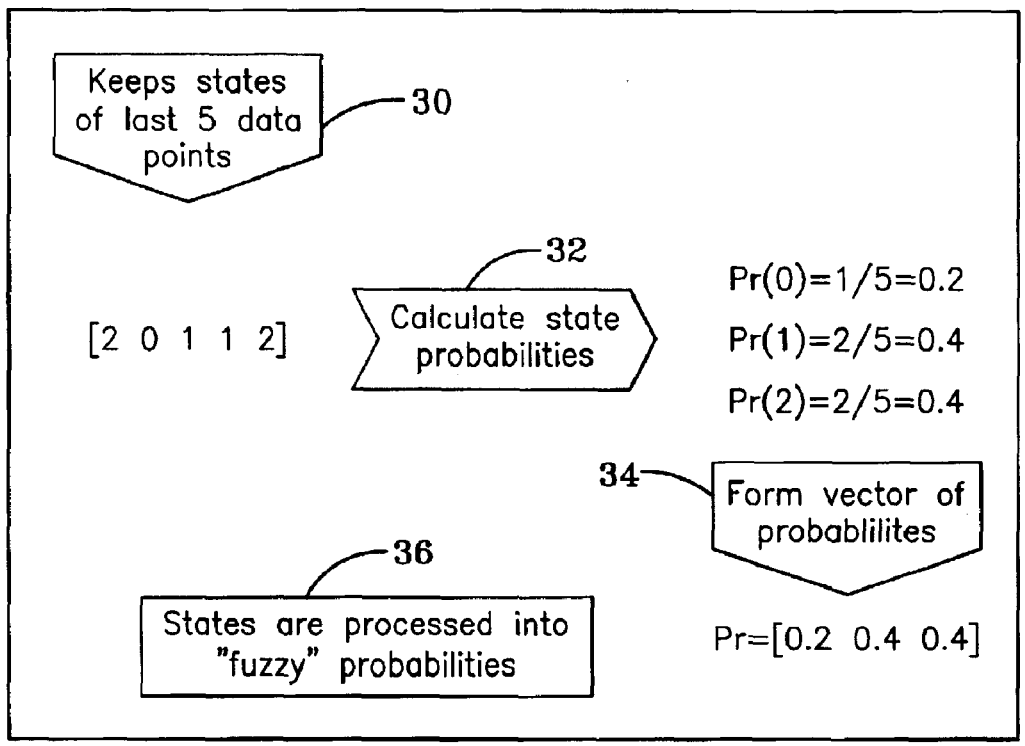
Figure 6:
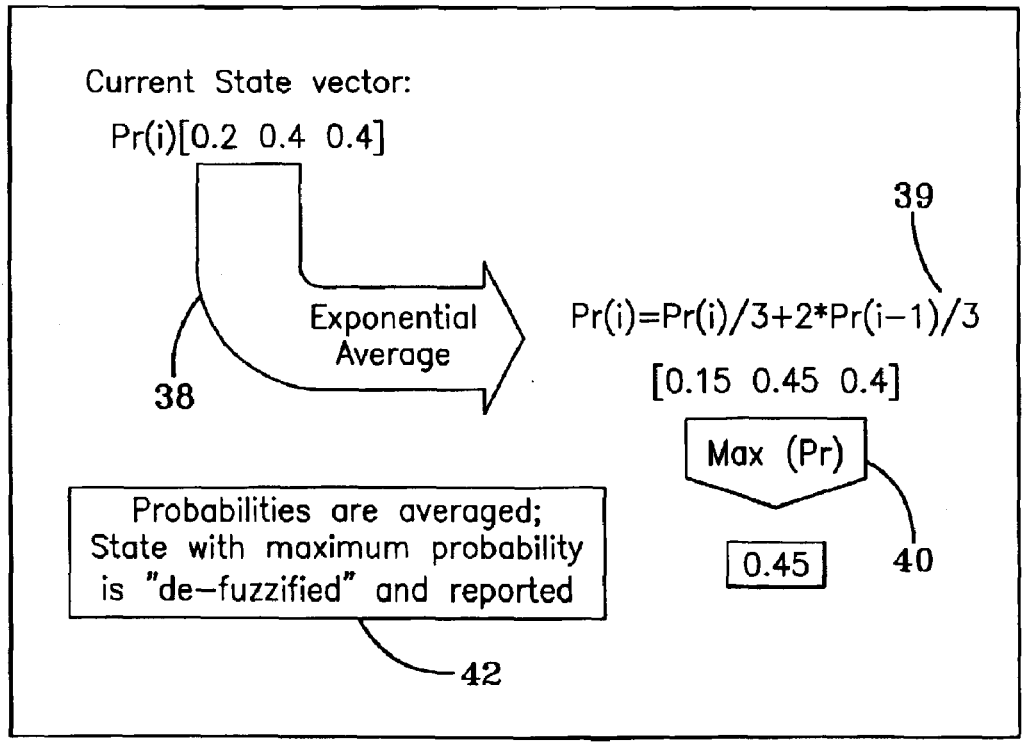
Figure 7:
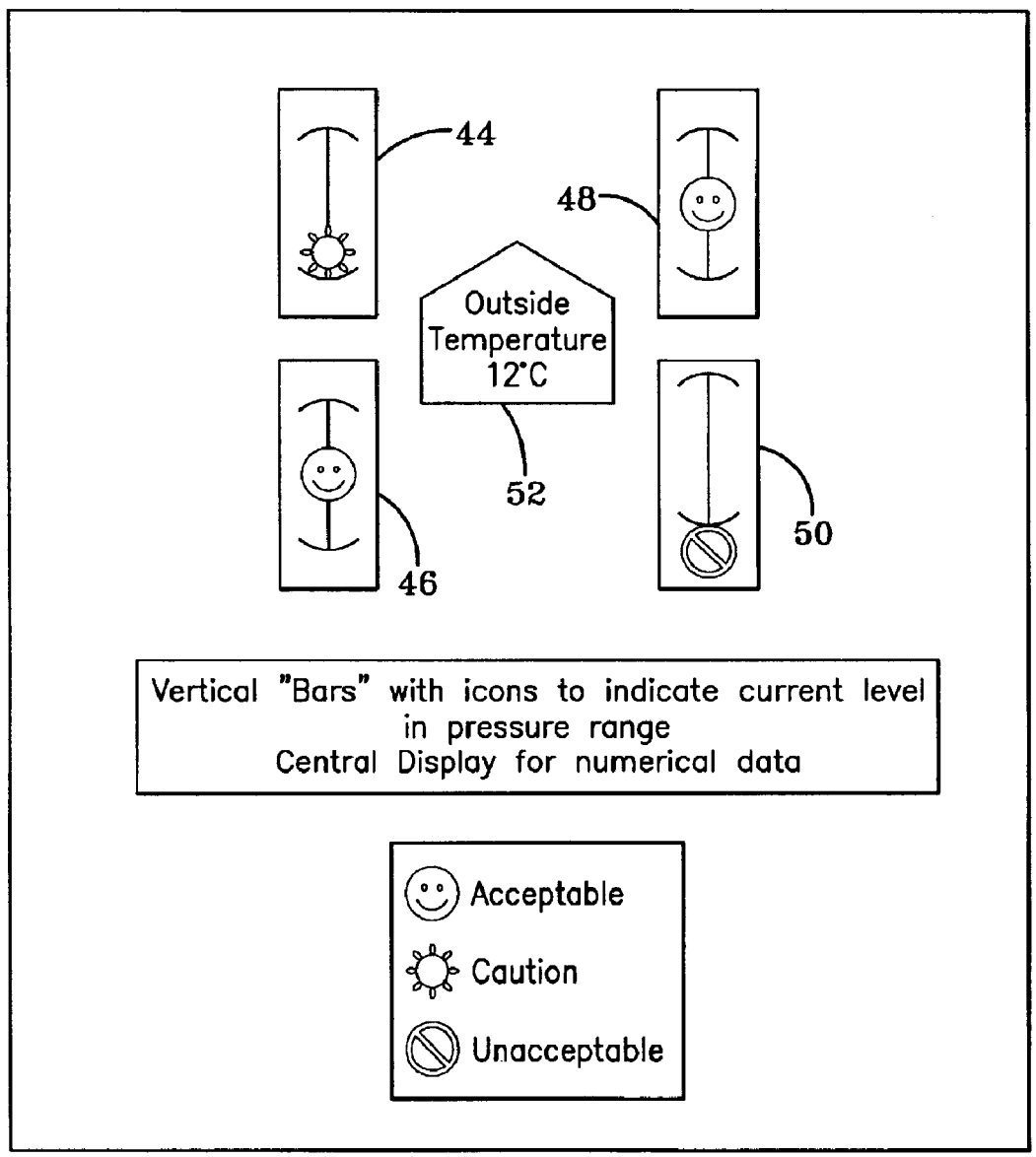
Figure 8A:
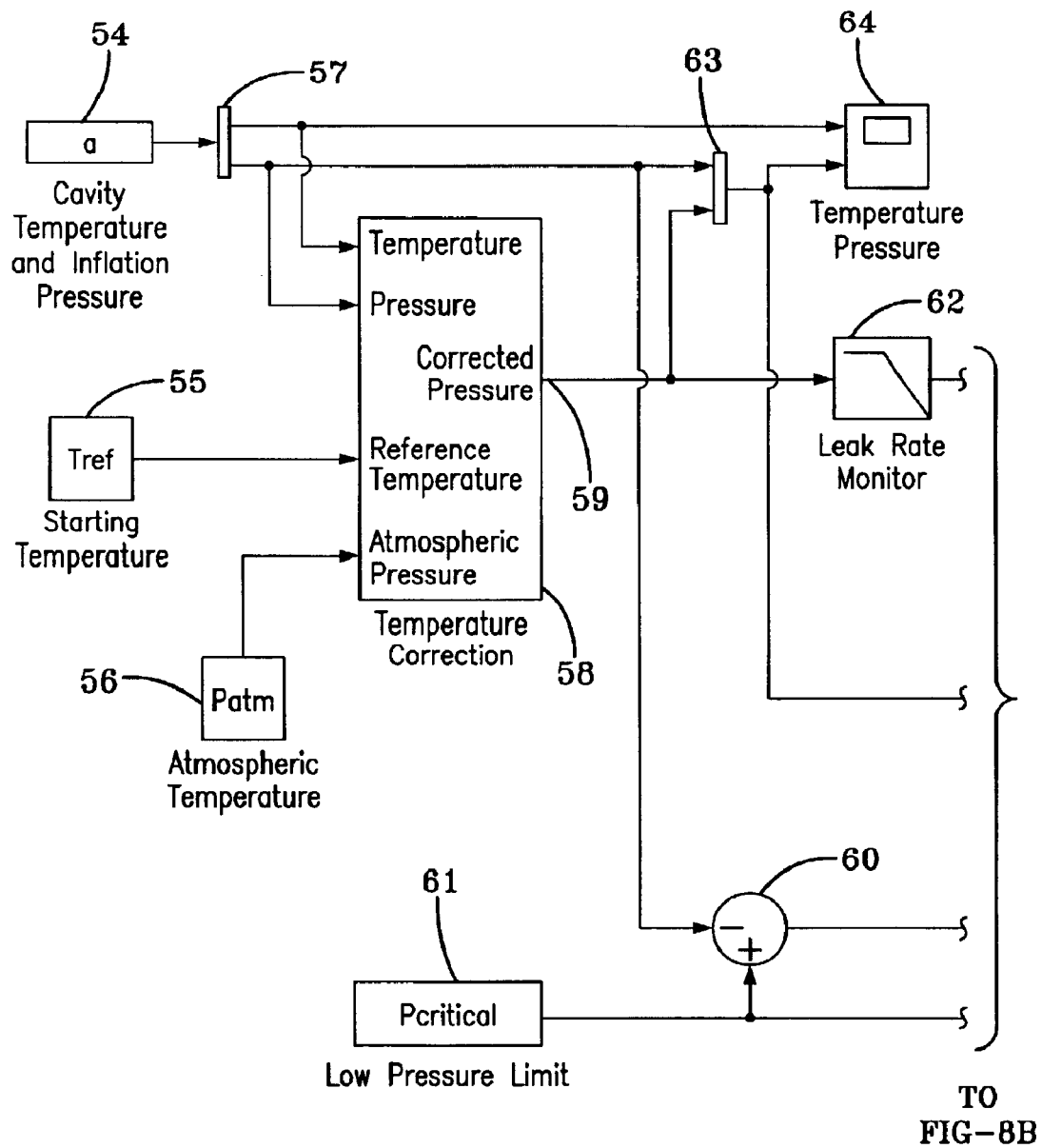
Figure 8B:
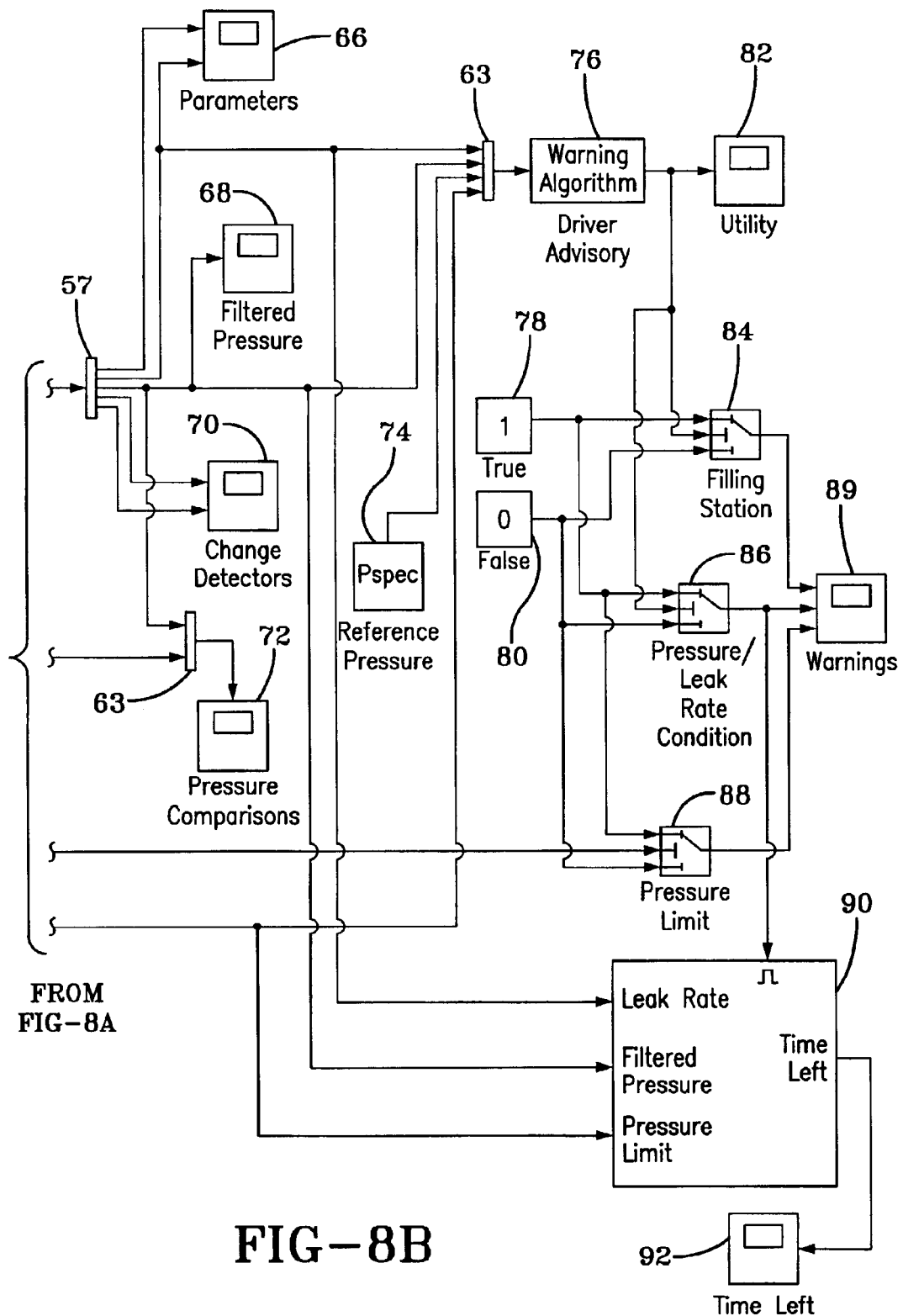
Figure 10:
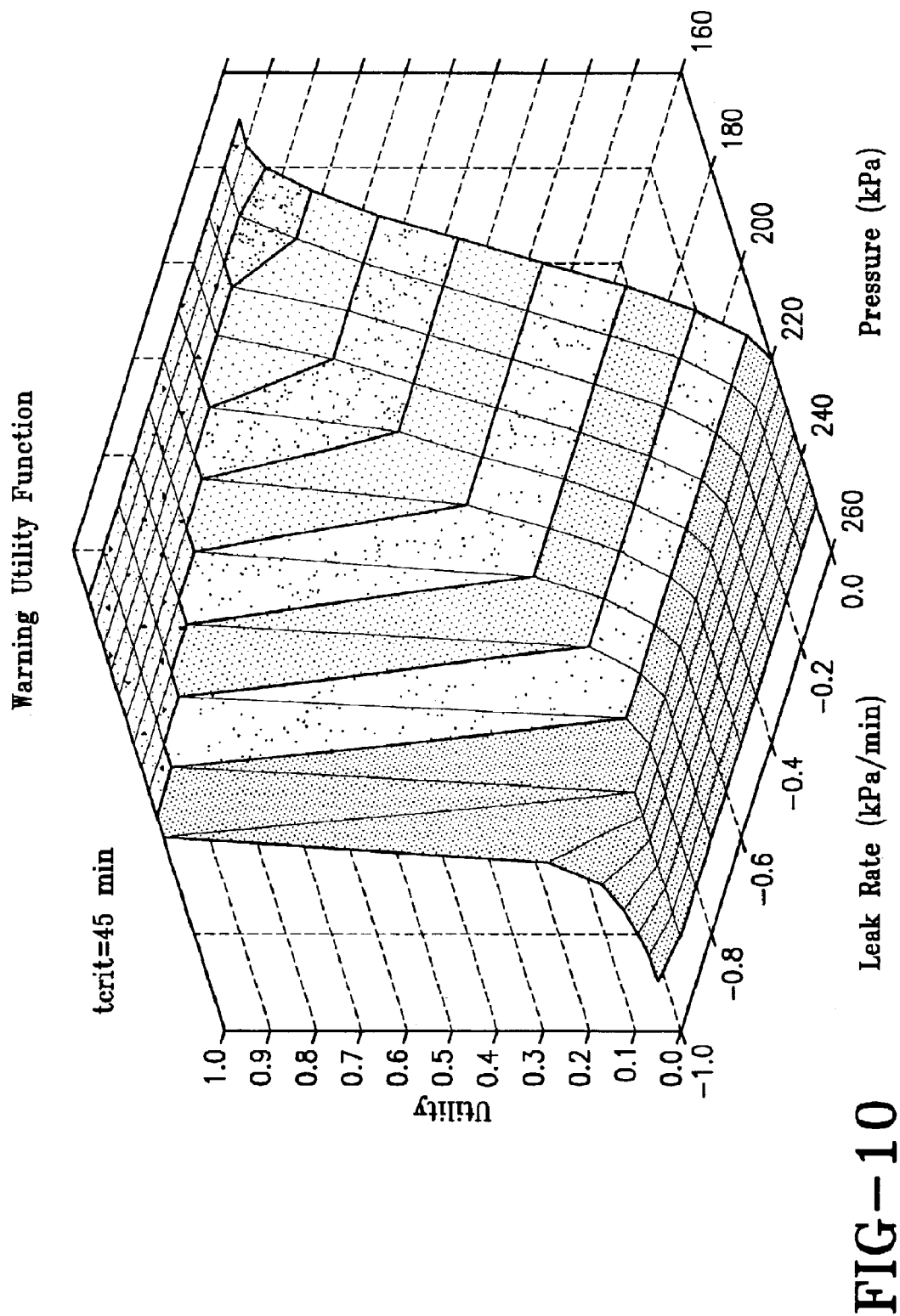
Figure 11:
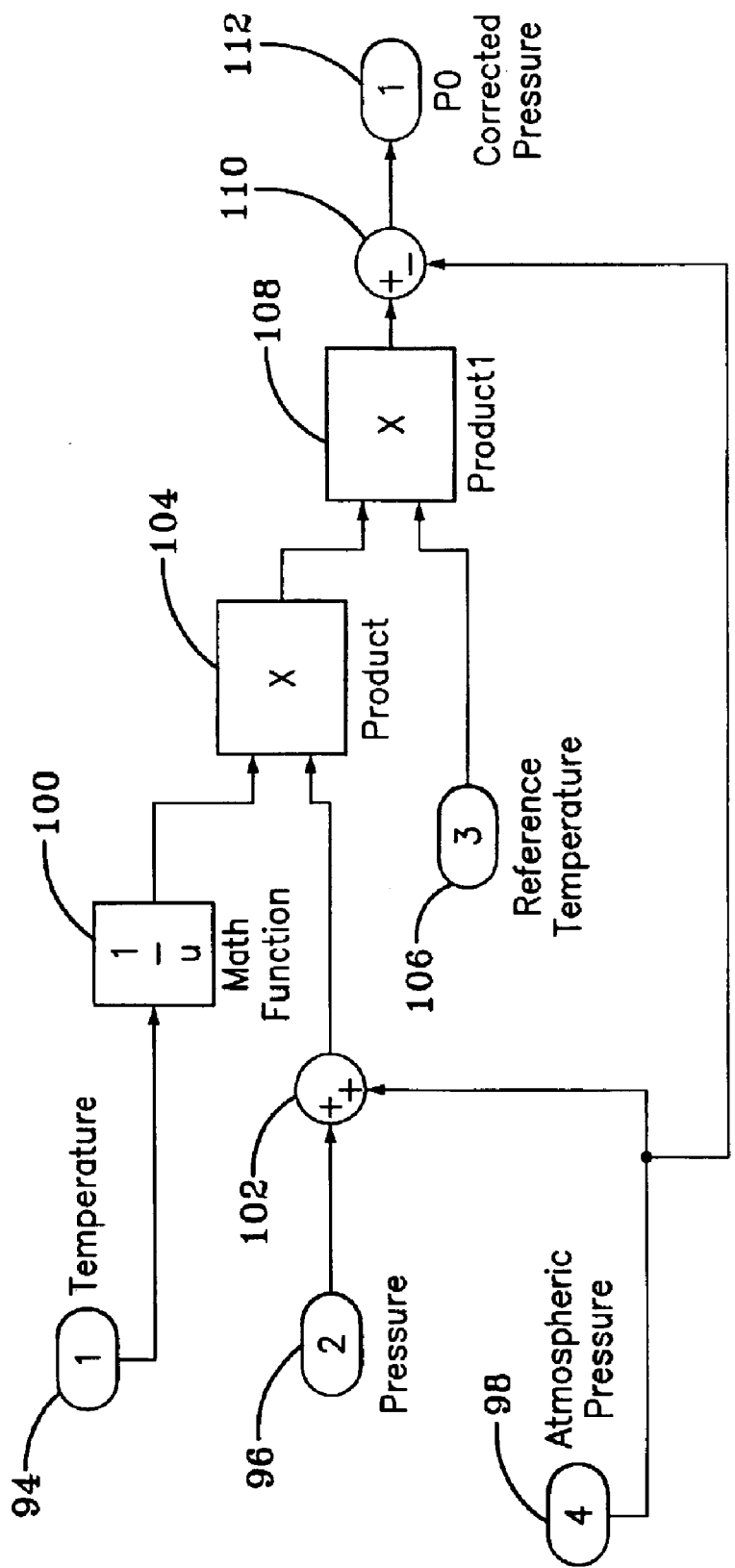
Figure 12:
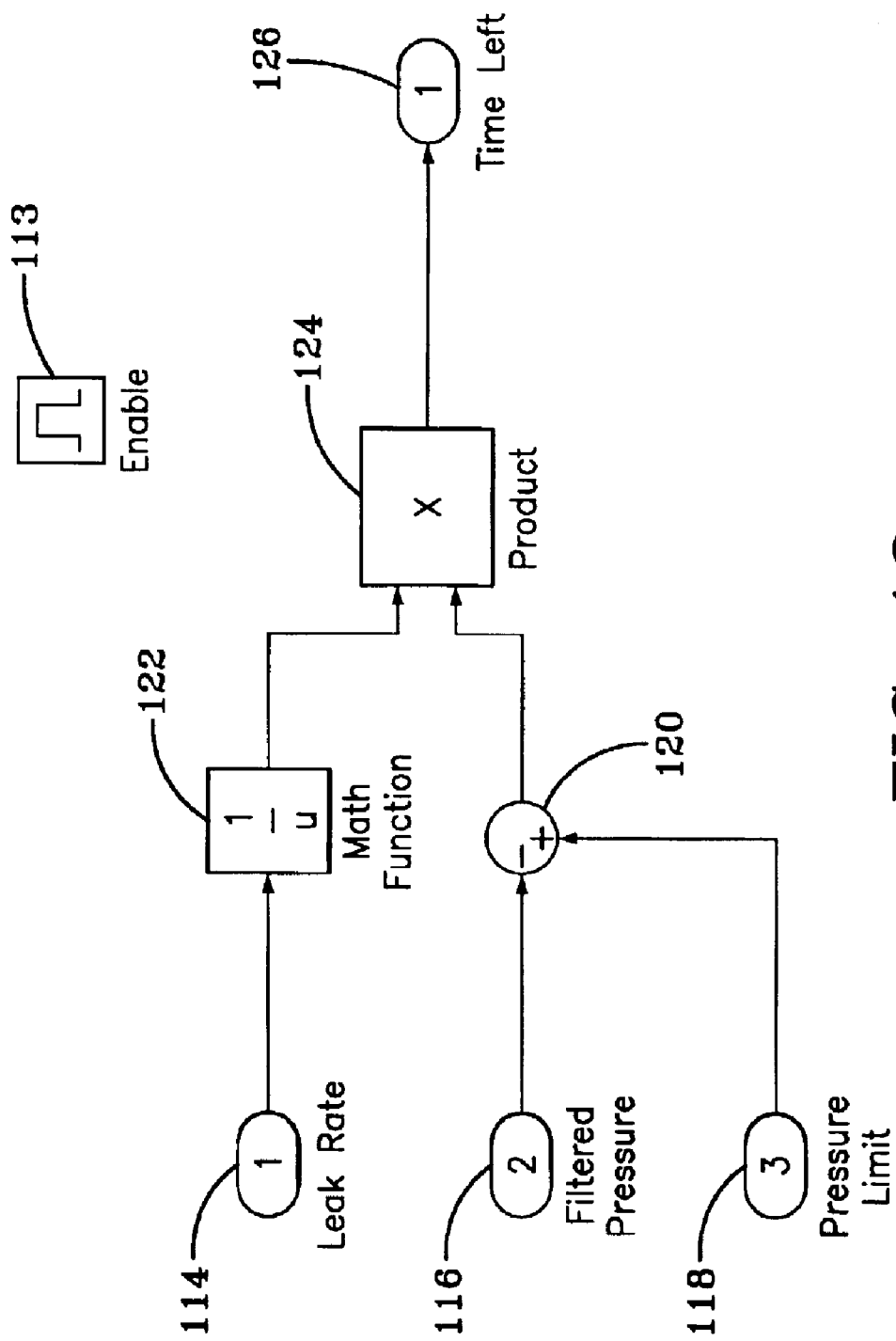

FIG. 5. is a flow chart showing fuzzy algorithm calculation of state probabilities;

FIG. 6 is a flow chart showing averaging of probabilities and identification of state with maximum probability;

FIG. 7 is a depiction of one possible display representation conveying information to a driver;

FIGS. 8A and 8B are function block diagrams of the warning pressure utility;

FIG. 9 is a graph of the pressure utility function;

FIG. 10 is a map of the combined utility as a function of pressure and leak rate;

FIG. 11 is a function block diagram of the temperature correction sub-system; and FIG. 12 is a function block diagram of the time left computation.

DETAILED DESCRIPTIONS OF THE PREFERRED EMBODIMENTS

The subject invention is described in a preferred embodiment and alternative embodiments herein and is directed toward providing a method for processing information in a tire pressure warning system. The method is hardware independent and may be utilized in interpreting data from a wide range of tire pressure monitoring systems that employ differing means for measuring tire pressure and temperature. The present method requires a relatively low level of data and therefore requires less processing and storage memory, whereby lowering hardware costs. Moreover, the method may be incorporated into a basic embodiment for warning a driver of tire pressure failure or enhanced into an advanced method that provides different alarms at different levels to warn the driver of an early indication of pressure leakage. Such an early warning allows the driver to remedially address the tire condition in a convenient manner and time. The method embodying the invention can further function to warn of low inflation condition or of excessive temperature over a range of speeds and loads and can correct for ambient and atmospheric pressure. False alarms are minimized by filtering of pressure and temperature data and the application of a fuzzy logic algorithm.

Figure 2:
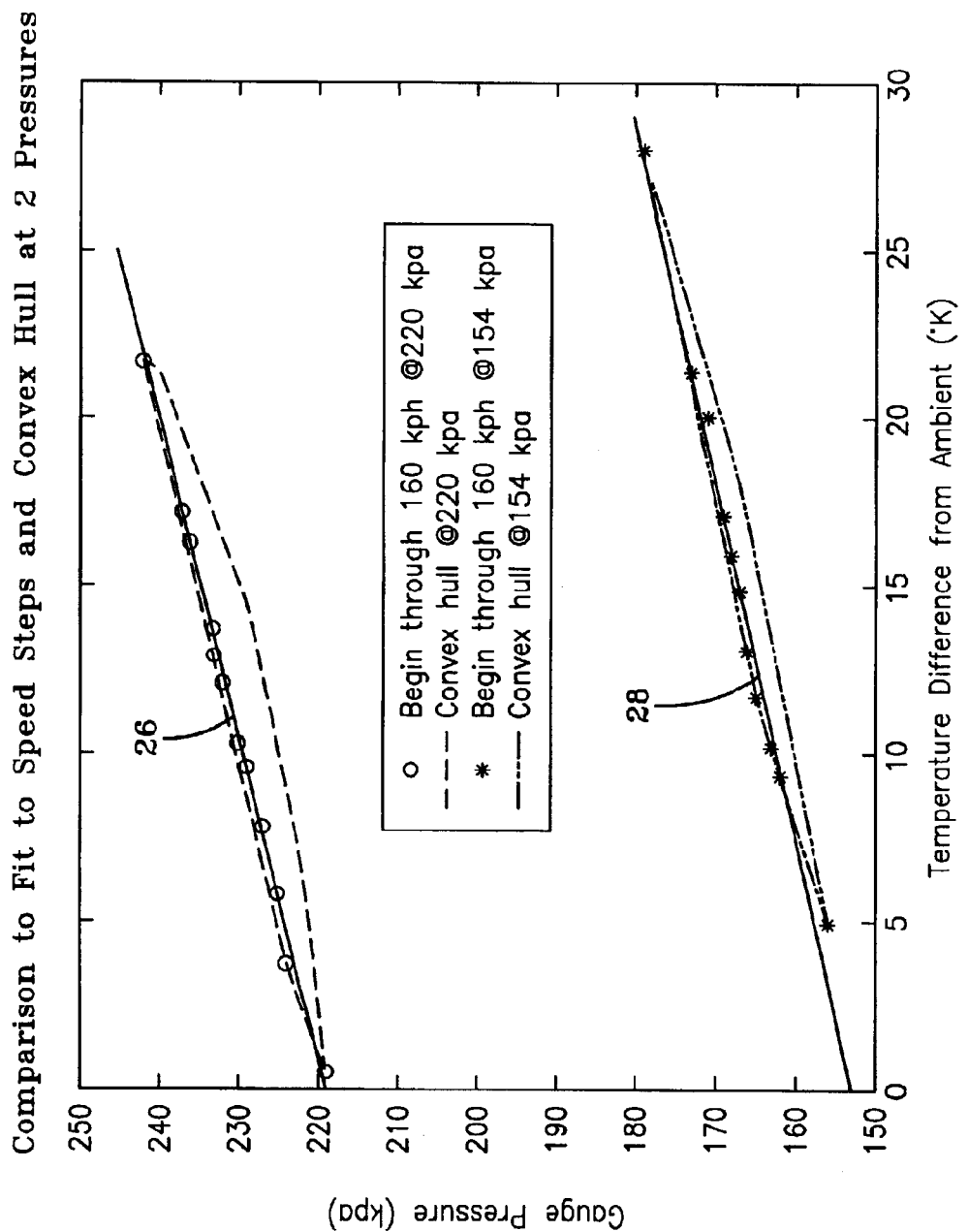
FIG. 2 is a graphical depiction comparing data at two inflation pressures.

Referring initially to FIG. 2, it will be appreciated that the Ideal Gas Law may be used to derive an equation that shows how measurements of inflation pressure and internal cavity temperature may be used to detect low inflation. The graph in FIG. 2 shows a plot of two inflation pressures over a range of speed and load conditions. The Ideal Gas Law describes the relationship between the absolute pressure, absolute temperature, and the volume of a gas.

$$PV = nRT \quad \text{(Eq. 1)}$$

The current derivation assumes that the volume of a tire's internal cavity is a constant, or nearly a constant. The pressure and temperature in equation 1 are in absolute units. The derivative of pressure versus temperature is expressed as:

$$dP = \frac{nR}{V} dT \quad \text{(Eq. 2)}$$

The difference in pressure is the same amount whether absolute or gauge pressure is used in equation 2. The tire is assumed to have a cold inflation of $p_0$ at an ambient temperature of $T_{amb}$. Equation 2 is expanded into the following:

$$p_g = p_0 + \left(\frac{nR}{V}\right)(T - T_{amb}) \quad \text{(Eq. 3)}$$

Equation 3 expresses the basic method of the detection algorithm. The pressures are measured gauge pressures. The temperatures are expressed in absolute terms (Kelvins). The equation says that the inflation pressure is a linear relationship with the difference in temperature from ambient. The algorithm requires a measurement of ambient temperature. It should be noted that the intercept of the line defined by equation 3 is the cold inflation pressure. The slope is a measure of the mass of the inflation medium per unit volume. The mass per unit volume is independent of tire size, making the algorithm more generally applicable.

The slope of the line in equation 3 can be estimated by referring to equation 1. Equation 3 then becomes:

$$p_g = p_0 + \left(\frac{p_0 + p_{atm}}{T_{amb}}\right)(T - T_{amb}) \quad \text{(Eq. 4)}$$

To properly estimate the slope, the ratio of absolute pressure to absolute temperature must be used in the coefficient of the temperature difference. Therefore, $T_{amb}$ is expressed in Kelvins in the denominator and the pressure of one atmosphere is added to the gauge inflation pressure in the numerator. The algorithm, accordingly, can be adjusted for altitude by measuring or estimating the atmospheric pressure in consistent units. An initial measurement of inflation pressure and temperature at cold startup can be used in the algorithm development.

By way of illustration, FIG. 2 illustrates a graph comparing empirically measured data taken of a tire at two inflation pressures, 220 kpa and 154 kpa, versus the temperature difference from ambient in degrees Kelvin. As speed increases, the temperature within a tire cavity increases. Plotting the gauge pressure against the temperature differential creates the data points at the two pressures shown in FIG. 2. It will be seen that the speed and load data from FIG. 2 can be fit to linear equation 4. The pressure and temperature have a well-defined relationship over a wide range of speeds and loads and fit lines 26, 28 at respective pressures. The intercept of the lines so defined by the measured data may be determined and represents the gauge pressure at ambient temperature (zero differential). The "convex hull" noted in broken line surrounding the lines 26, 28 represents a region of data scatter at a given cold inflation pressure. The convex hull region is utilized as explained below in regard to a fuzzy classification scheme for expressing the area of uncertainty.

It should further be noted from FIG. 2 that the maximum temperature reached at the lower inflation pressure is higher than that of the higher inflation pressure. A boundary region is thus defined by the maximum temperatures and pressures at maximum load and speed points over a range of operating pressures. This boundary is outlined in the pressure-temperature differential map 1 of FIG. 1 and is used in the algorithm development.

Figure 1:
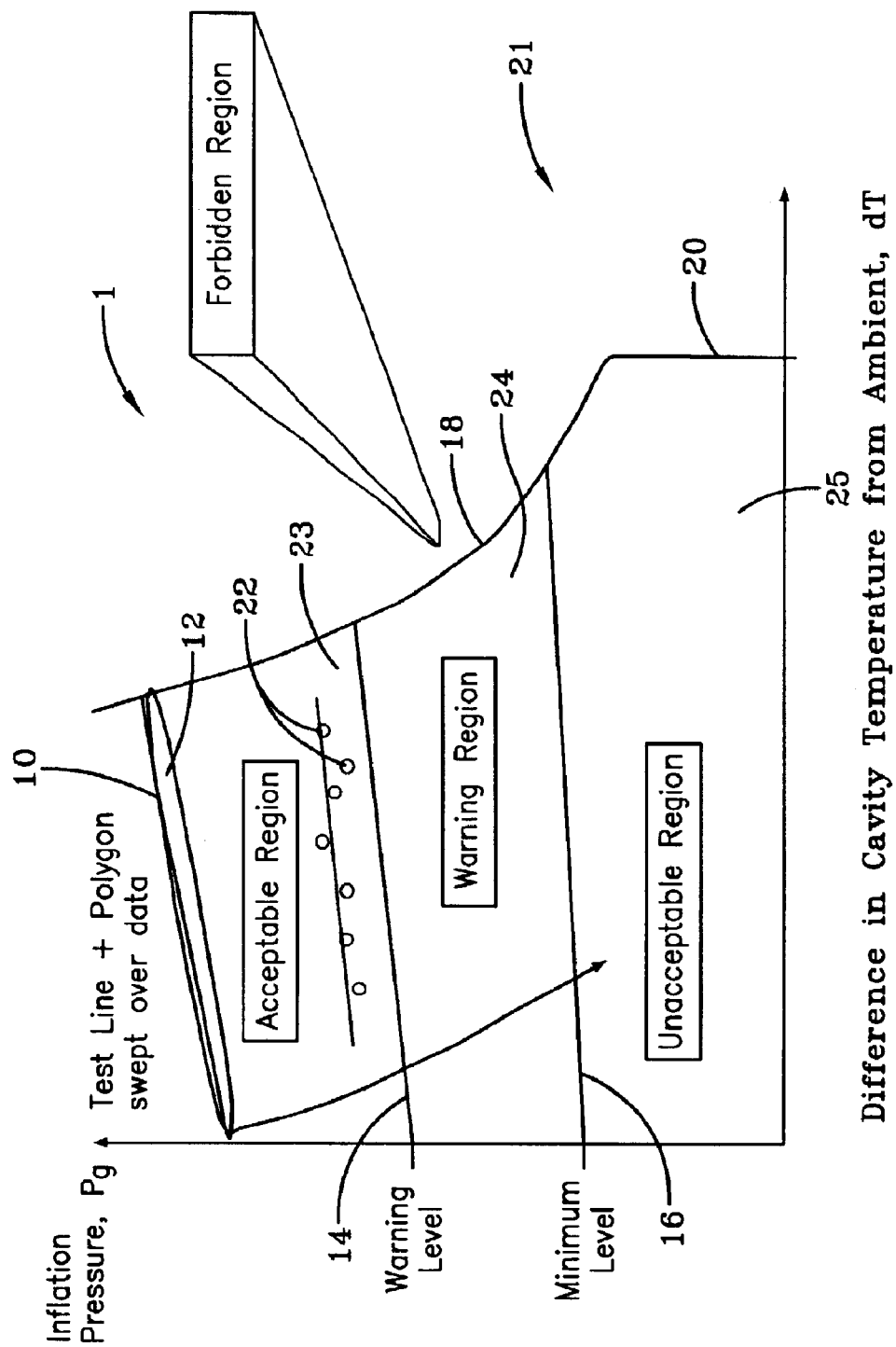
FIG. 1 is a graphical depiction of inflation pressure vs. cavity temperature differential to ambient temperature.

Following is a sequential derivation of algorithms used to map tire pressure to temperature differential under varying loads and speeds. FIG. 1 illustrates in graphical fashion the algorithms so derived and reference is made thereto. While represented as sequentially numbered steps, it is not intended that every step be performed in the practice of the subject invention. Individual steps may be omitted, if desired, whereby creating different methods or embodiments, each remaining within the scope of the subject invention.

Step 1: Sweep Line & Polygon Over the Data

An ambient temperature measurement is made. As the vehicle begins operation, tire cavity temperature and pressure data are acquired, and, pursuant to the subject invention method, a test line 10 is generated with slope and intercept defined by linear equation 4. A polygon structure is attached to the line to represent a convex hull 12 and define a fuzzy class around the line. The geometric structure is swept over the data by varying the assumed cold inflation pressures. The data points are tested to see if they lie inside the polygon at each assumed inflation condition. The cold inflation pressure that contains the maximum number of data points in the convex hull over a specified period of time is used to determine cold inflation pressure. Based upon the cold inflation pressure, an inflation warning pressure condition is determined.

Step 2: Fit the Data to a Line

As the vehicle continues and significant speed range and time have occurred, the data can be fit and the intercept can be used to update the cold inflation prediction from step (1) above. A Bayesian estimation process can be used that applies both the fitted data, and the results from the convex hull algorithm to improve the estimate. At the same time a Bayesian estimate of the slope can be used to track the mass per unit volume of air in the tire. Historical data can be used to define a lower limit on this number. The normalized mass of air is an additional indicator that may be used in a warning algorithm if desired.

Step 3: Calculate Directly the Cold Inflation Pressure and Average

Equation 4 can be re-arranged as follows:
First define the temperature difference:

$$dT = T - T_{amb} \quad \text{(Eq. 5)}$$

Multiplying out equation 4 and gathering the $p_0$ term gives:

$$p_g = \left[1 + \frac{dT}{T_{amb}}\right] * p_0 + \frac{dT}{T_{amb}} * p_{atm} \quad \text{(Eq. 6)}$$

Define the following variable:

$$\alpha = \frac{dT}{T_{amb}} \quad \text{(Eq. 7)}$$

Solve equation 6 for the cold inflation pressure as:

$$p_0 = \frac{p_g}{1+\alpha} - \left[\frac{\alpha}{1+\alpha}\right] * p_{atm} \quad \text{(Eq. 8)}$$

Equation 8 can be used to directly compute a value of cold inflation pressure. The gauge pressure $p_g$ is thus filtered to a cold inflation pressure and compensation is thereby effected for the factors, such as load, temperature, and environmental pressure, that can affect gauge pressure sensor readings and measurements. Correcting the gauge pressure to a filtered cold pressure value at the reference temperature (ambient) thereby provides a reliable value to compare against the tire inflation warning condition established in step (1) above.

Step 4: Membership of Fuzzy Regions Defined by Boundaries

Fuzzy set boundaries, as shown in the map 1 of FIG. 1, are defined at a warning level and at a lower limit level by lines 14, and 16, respectively, on the inflation pressure, $p_g$, and differential temperature, dT, space. The lines are generated by using equation 4.

A left boundary level is defined by zero difference from the ambient temperature. A maximum boundary at the right side 18 is defined by the difference from ambient of the maximum temperature at the maximum load and speed condition at each pressure. An additional upper limit 20 can be determined from a chosen maximum temperature limit. The data points 22 are tested for membership in one of four regions. If the data are predominantly above the warning line 14, in region 23, a safe condition exists (green light). If the data are predominantly in the area 24 below the warning line, a cautionary condition exists (yellow light). If the data are below the minimum level in the region 25, an unacceptable condition exists (red light). If high temperatures force the data into the high temperature region 21 at the right hand side of the map, an indicator (flashing light) indicating an extreme condition would be given.

Figure 3:
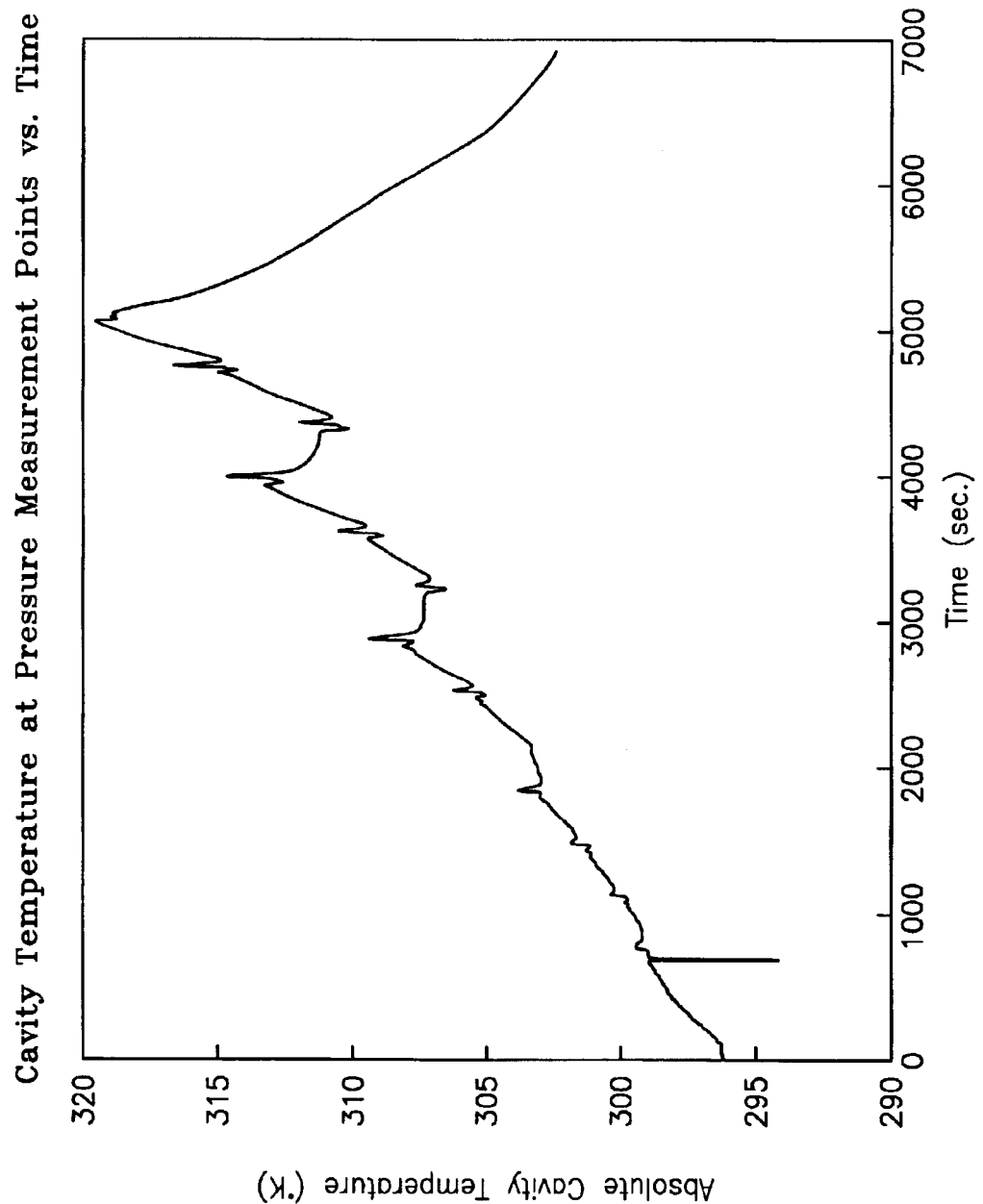
FIG. 3 is a graphical depiction of cavity temperature vs. time at 220 kpa of inflation.

FIG. 3 is a graph of cavity temperature at pressure measurement points vs. time at increasing speed and is illustrative of the rise in cavity temperature over time from a start up (cold) temperature of 297 Deg. Kelvin through an operation period resulting in a maximum temperature of 319 Deg. Kelvin and thereafter through a cool down period. Temperature fluctuations of the type illustrated in FIG. 3 will cause pressure readings to vary widely and can cause consequent false alarms to be generated in conventional tire pressure warning systems. The subject invention and method obviates the effect of cavity temperature variance by correcting the gauge pressure to a filtered pressure value at the reference temperature using the above-discussed methodology. As noted, the temperature best suited to serve as the reference temperature is the ambient temperature.

The algorithms discussed above provide a plausibility check combining a standard deviation check with temperature and pressure beyond physical limits monitoring that can serve to warn a driver when temperature and/or pressure exceed a physical limit and create a risk. Thresholds are established and the gauge pressure may be filtered to a corrected value at the reference temperature and compared against one or more threshold limits. The subject methodology thus provides a basic framework for interpreting tire pressure and temperature information that is hardware independent and may be utilized in a myriad of tire pressure warning systems.

It is also desirable to provide a method of interpreting tire pressure warning system data that can provide advanced pressure leakage warning to a driver and driver assist convenience functions. To do so, a leak rate must be identified and an estimation made as to the time remaining before the tire pressure, decreasing at the identified leak rate, crosses threshold level(s). The leak detection methodology must be robust and function in a highly predictive manner, minimizing the potential for false alarms.

The subject invention in an alternative embodiment satisfies such a need. A method of processing noisy information from tire cavity pressure and temperature sensors is provided to give the driver a warning of low inflation conditions, an estimate of the leak rate, and/or an estimate of the time remaining before pressure reaches a critical value.

The pressure vs. temperature map and its associated boundaries as determined by the Ideal Gas Law as discussed previously may be utilized as a framework for understanding the subject method. To the fundamental method a probability based algorithm and method is added for processing measurements and avoiding spurious warnings. A recursive least squares filter is developed, suitable for implementation on a computer chip, in order to fit the pressure data to a leak rate model. The leak rate and enhanced warning logic can be used to warn a vehicle driver based on a combination of pressure and leak rate information. Additionally the model parameters are used to forward predict a time period at which the pressure will fall below some specified value. The forward prediction of time based pressure event can be used to additionally inform the driver so that the driver may exit the highway and seek corrective or preventative maintenance. The filter mechanism also includes change detection in order to restart the filter when significant change in leak rate or pressure occurs. In addition, a user information display concept is described below that may be used to communicate warnings to the vehicle operator.

Figure 4:
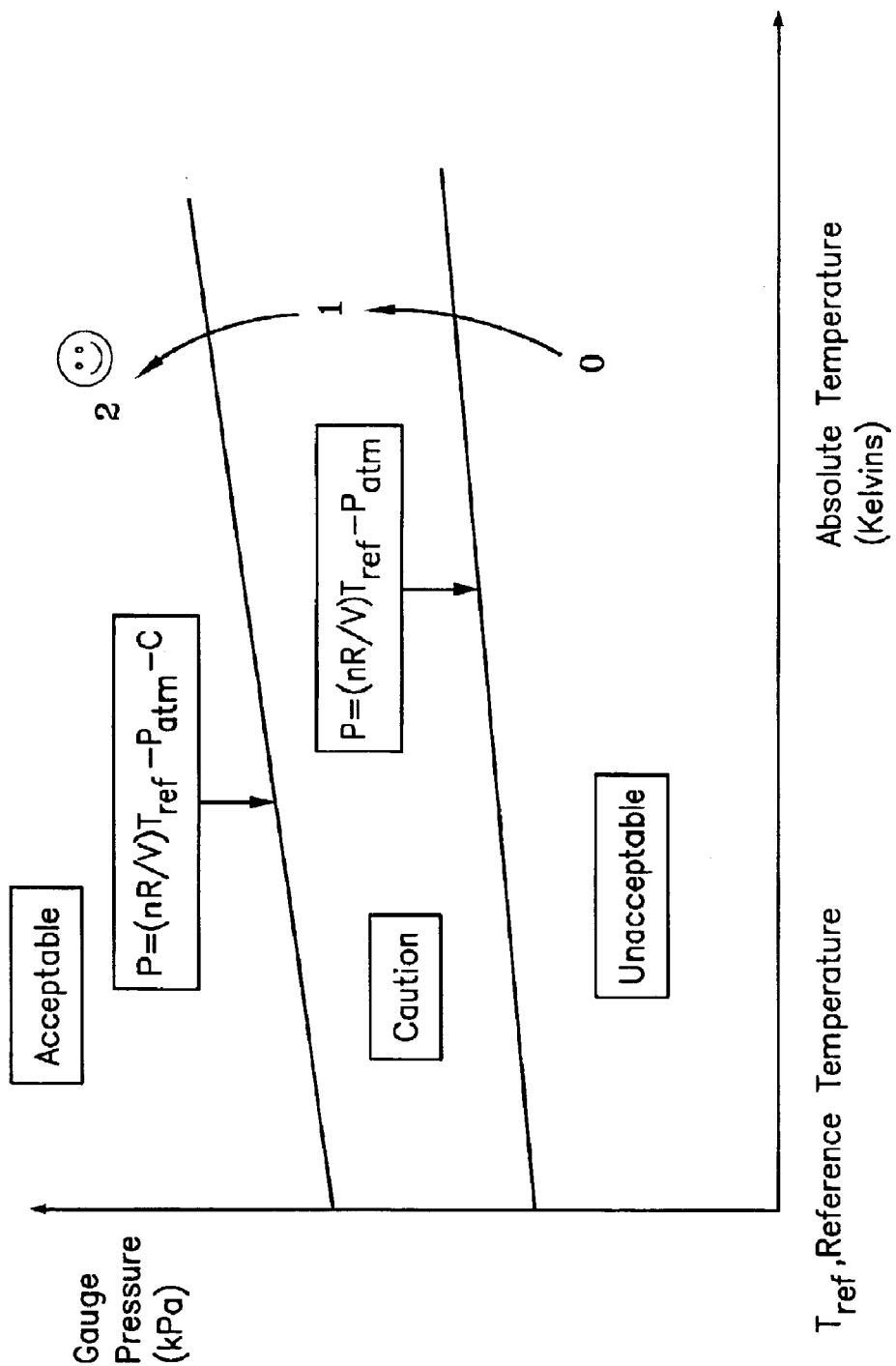
FIG. 4 is a graph of inflation pressure vs. cavity temperature boundaries and identifying state regions.

With reference to FIGS. 4 and 5, FIG. 4 comprises the pressure temperature map of FIG. 1 separated by boundaries defined by the Ideal Gas Law. A state {0, 1, 2} is determined by the indicated line crossing algorithm. The state 0 is defined as the region identified as "unacceptable" in FIG. 4; state 1 for the region marked "caution"; and state 2 for the region identified as "acceptable". The pressure intercept may be adjusted by an amount C=standard deviation due to measurement error. Each pressure, temperature data point is classified into a state. The states of the last five data points are maintained as indicated at block 30 of FIG. 5. In FIG. 5 an example is presented in which the last five data points have states [2, 0, 1, 1, 2]. The state probabilities (block 32) are then calculated to form a vector of probabilities (34). For the example shown the vector of probabilities is Pr=[0.2, 0.4, 0.4]. The states are then processed (block 36) into "fuzzy" probabilities by the method shown in FIG. 6. The Current State vector Pr(i)=[0.2, 0.4, 0.4] is exponentially averaged (block 38) by utilization of the algorithm 39:

$$Pr(i) = \frac{1}{3}Pr(i) + \frac{2}{3}Pr(i-1) \qquad \text{(Eq. 9)}$$

yielding [0.15, 0.45, 0.4]. The Max(Pr) is identified (block 40) to be 0.45 and represents State 2. The maximum probability is therefore determined to be State 2 and the state is "de-fuzzified" and reported (block 42). A state 2 indicates pressure within the "acceptable" region of FIG. 4. With the occurrence of the next data point representing pressure and temperature the process is repeated for the five most recent data points.

It will thus be appreciated that the subject fuzzy algorithm quantifies probability of a warning state based on multiple points by the exponential averaging of probabilities for the five most recent data points. The accuracy of the measured data may be adjusted by a factor incorporated into the algorithm, if so desired. Because the fuzzy probability is based on the five most recent data measurements, the amount of data required for its calculation is small, conserving memory and processing capacity. Moreover, the five points that are utilized for the computation of the warning state via the fuzzy algorithm may be reset at any time in the event that a precipitous change from point to point is detected. In addition, the sampling rate that is utilized to generate the five measurement points used to calculate the warning state may be varied as a caution boundary is crossed if so desired. While five data points are described above for the purpose of calculating the warning state, more or fewer data points may be employed. It is also within the contemplation of the subject method that more or less number of states can be used and the probability method can be applied to other variables (e.g. "time left") in addition to the pressure.

The flexibility in the subject algorithm allows for adjustment in the exponential averaging by altering the number of sample points kept or altering the sample rate. Leak rate detection may be generated by tracking time across two levels. The leak rate is therefore the rate at which pressure changes over time. A maximum temperature detection may also be added, representing the boundary point 20 in the polygon of FIG. 1.

To identify the Leak Rate, the data are first compensated to a reference temperature, preferably ambient, as described above. A filter is employed that uses an exponential decay with time constant $\tau$, to model pressure leakage by the following:

$$P = P_0 e^{-\left(\frac{t}{\tau}\right)} \qquad \text{(Eq. 10)}$$

Where P=absolute pressure in the cavity at time t; and $P_0$=initial absolute pressure in the cavity at time t=0.
The Time Constant $\tau$ varies with temperature:
$\tau = V/(c_4 R T)$ where V=volume of tire cavity; $c_4$=flow coefficient of the valve orifice; R=ideal gas constant; and T=absolute cavity temperature.

The filter recursively performs a linear least squares regression to the logarithmic form of the leak rate equation:

$$\ln(P) = \ln(P_0) + \left(-\frac{c_4 R}{V}\right)\{T * t\} \qquad \text{(Eq. 11)}$$

(Note: The regression variable is temp*time):
The filter estimates the coefficient vector:

$$\theta = \left\{ \begin{array}{c} \ln(P_0) \\ -\frac{c_4 R}{V} \end{array} \right\} \qquad \text{(Eq. 12)}$$

The adaptive Recursive Least Squares (RLS) filter produces a smooth estimate of the current pressure and adaptively estimates model parameters: initial pressure $p_0$ and time constant factor $(-c_4 R/V)$. The parameter estimates evolve with each new data point. As mentioned, the recursive filter means no large data set is kept to minimize use of memory storage and facilitates hardware implementation on a chip. The Leak Rate and filtered pressure can be used in combination to determine more sophisticated logic rules for a low pressure warning system. For example IF (Pressure is IN SPEC) and (Leak Rate is Greater Than X kpa/min) THEN Action [Issue audible alert, Report time left to reach critical pressure]. Other leak rate models (e.g. quadratic leak rate model) and other pressure and/or leak rate filters may be also employed in alternative embodiments of the invention if desired.

It was found that in the range of inflation pressures between the recommended pressure $p_0$ and a lower critical pressure of 80 percent of $p_0$ that the pressure behavior could be represented by a linear model. In this alternative embodiment the filter recursively performs a linear least squares regression to the linear form of the leak rate equation $$P = P_0 + K * t \qquad \text{(Eq. 13)}$$

where K and $P_0$ are the slope and intercept parameters respectively that are determined by the recursive least squares filter. The filter estimates the parameter vector $$\theta = \left\{ \begin{array}{c} P_0 \\ K \end{array} \right\} \qquad \text{(Eq. 14)}$$

The use of the linearized model in Equation 13 allows the algorithm to be more easily implemented on an embedded microprocessor (a.k.a. "chip") in comparison to the logarithmic version of equations 11 and 12.

FIG. 7 illustrates one of many alternative Use Information Display configurations. An array of four vertical bars 44, 46, 48, and 50 may be used to represent the four tires of a vehicle and icons are employed to indicate the current level in pressure range. The icons may vary depending upon the pressure status as shown. The outside temperature may also be indicated as shown at 52.

The subject Corrected Pressure and Leak Rate algorithms may readily be programmed into a processor in a conventional computer language. One skilled in the programming art may produce computer code in a suitable language (for example the C language) and then compile it onto an embedded computer chip in machine readable code for use in a vehicle. The Leak Rate detector algorithm and the corrected inflation pressure may further be combined into a utility function that may be used to decide when to warn a driver. At low values of utility, the warning to the driver may be delayed. The driver may be warned, in such an event, at a gas station or other convenient time to check tires and maintain inflation. When the utility is 1, the driver receives an immediate caution message and a prediction of time to cross a given level is computed and displayed. The level upon which the cross-over is calculated is the low pressure warning limit specified by legislation, industry standards, or vehicle manufacturer practice.

FIGS. 8A and 8B illustrate a Simulink Model block diagram for the subject Leak Rate detection and Warning Utility. Referring to the diagram it will be seen that the cavity temperature and inflation pressure are gauge values (block 54) derived from measurement by any one of sundry detection systems and hardware in commercial use. The reference temperature 55 (Tref), preferably at ambient, is determined by the method described previously. Atmospheric pressure 56 (Patm) is a measured value. The temperature, pressure, a reference temperature, and atmospheric pressure are utilized (block 58) in Equation 8 above to calculate a corrected, or cold inflation pressure 59. Blocks 57 represent the performance of a demultiplex function and blocks 63 a multiplex function pursuant to the program.

Continuing, data representing the corrected pressure and cavity temperature and inflation pressure are combined at block 64. Sequential readings of corrected pressure are used to calculate a Leak Rate by the difference in pressure over time formula. Output information from the Leak Rate Monitor 62 is input into parameters 66; filtered pressure 68; change detectors 70; and pressure comparison 72 as shown. The reference pressure, Pspec (Patm) at 74, filtered pressure, adjusted pressure measurement $P_o$; and $P_{critical}$ are used in the Warning Algorithm (block 76) to arrive at an appropriate driver warning. The warnings are set by binary logic at 78, 80 where true=1 and false=0 respectively. The utility function (displayed at 82) is determined and, based upon binary logic a warning is issued (block 84) to the driver to fill the tire(s) at a filling station. Binary logic also determines via pressure/leak conditions 86 and the pressure limit 88 whether warnings (block 89) to the driver are required. An advance warning, true=1 further triggers a time left computation block 90 resulting in conveyance of time left calculation and communication to the driver at 92. The utility functions may be used in combination or individually and the utility function may also be applied directly to "time left" if so desired.

FIG. 9 is a graph of the utility function for pressure. The utility, $U_p$, remains at "0" for pressures at $P_{spec}$. As the corrected pressure falls below specification toward a critical threshold level, $P_{critical}$, the utility increases from "0" along a substantially linear path to "1" level. The utility function is a fuzzy z membership function that evaluates how much the filtered pressure value belongs to a "bad" class. It defines the transition of pressure from "Good" (greater than the specified pressure) to "Bad" (less than the critical pressure) using a cubic spline.

Likewise, the leak rate utility, $U_K$, uses the same z function, with upper and lower limits of the leak rate defined in terms of pressure values and a critical time:

$$K_1 = \frac{(P_{critical} - P)}{tcrit} \quad \text{(Eq. 15)}$$

$$K_0 = \frac{(P_{critical} - P_{spec})}{tcrit} \quad \text{(Eq. 16)}$$

P in Equation 15 is the filtered estimate of the pressure that is provided by the Leak Rate Monitor. The intent of $K_o$ is to define a nominal leak rate value at which a warning will be issued. At the leak rate $K_o$, the pressure will go from a specified value down to the critical lower limit in the time, tcrit. Therefore $K_o$ defines a negative leak rate. Similarly, $K_1$ defines a variable leak rate that depends on the current pressure. As the pressure gets closer to the critical value, the acceptable leak rate switches to $K_1$, which is less negative, i.e. the magnitude is lower.

The two utility functions are then combined into a single value using the "probabilistic or" formula:

$$U = U_p + U_K - U_p * U_K \quad \text{(Eq. 17)}$$

The combined utility map as a function of Pressure and Leak Rate is shown in three dimensions in FIG. 10. Note that the effect of the selected functions is to create a diagonal transition across the Pressure, Leak Rate plane at the value U=1. The combined value of the utility may be fed into two switch blocks. The first switch block has a lower threshold value in the range of (0.1–0.8) and produces a soft warning. The lower threshold moves the utility value at which the warning activates down the pressure axis, so that the driver would not receive undue warnings when the pressure was slightly below spec (assuming no significant leak rate). This condition might occur due to ambient temperature fluctuation or driving to a lower altitude. When the Utility exceeds the lower threshold, the first switch sets a logic value of 1. The driver is advised to add pressure at a filling station or other convenient time. This warning will activate before the second switch, and stays active if the condition worsens to the point that the utility goes to 1 and gives the following immediate warning.

Using a threshold value near 1 (e.g. 0.9995) sets a logical warning of 1, or true, on the second switch for an immediate caution warning. The driver would receive an immediate caution warning that a pressure and leak rate condition existed which requires attention. The switch then enables a block that computes time left to reach the critical low pressure value for display to the driver. This warning block activates at the pressure and leak rate combinations in FIG. 10 where the utility is 1.

A third switch (Pressure Limit) may be directly controlled by the actual inflation pressure compared to the critical value. This switch gives the direct warning that pressure has dropped below the legal limit. The prior two warnings may, but need not necessarily be, still active when this logic is activated.

FIG. 11 illustrates a Temperature Correction Sub-system block diagram in accordance with the present invention. The temperature 94, pressure 96, atmospheric pressure 98, and reference temperature 106 are mathematically combined at blocks 100, 102, 104, 108, 110 to yield Corrected Pressure 112 in accordance with the following equation:

$$P_0 = \frac{T_{ref}}{T}(P_{gauge} + P_{atm}) - P_{atm} \quad \text{(Eq. 18)}$$

FIG. 12 illustrates the Time Left Computation in block diagram. The Leak Rate 114, Filtered Pressure 116, and Pressure Limit 118 are input into the function blocks 120, 122, 124 responsive to an enable signal 113 and in accordance with the following equation:

$$TimeLeft = \frac{(P_{critical} - P)}{K} \quad \text{(Eq. 19)}$$

where K equals the Leak Rate and P equals the filtered pressure estimate. The Time Left Computation results in a value for Time Left 126 before the pressure crosses a critical threshold value.

From the foregoing, it will be apparent that the objectives of the invention in solving the needs of the industry are satisfied by the preferred embodiment. The system provides a method for processing information in a tire pressure monitoring system that is: hardware and measurement methodology independent; efficient in requiring minimal data storage and processing so as to lower associated hardware costs; capable of providing different alarms at different levels; and reliable in its operation, providing a minimal number of false alarms. The method compensates for measurement anomalies in temperature and pressure by filtering the measured gauge values of pressure to a reference temperature using the Ideal Gas Law. By means of a basic warning algorithm, a driver is alerted when a filtered pressure measure crosses a preset threshold. In an advanced or extended algorithm, the system can identify a leak rate, perform temperature compensation and filtering to arrive at an estimation of leak rate and remaining time to threshold. The data interpretation methodology provides multi-thresholding, provides early warning in case of leakage and at different levels; considers environmental conditions such as load and speed; and provides non-critical warning at a useful time or location to a driver.

The system described above evokes a warning when the pressure, adjusted for temperature pursuant to the Ideal Gas Law, falls below a prescribed threshold value. One or more pressure limits are set as thresholds. The subject method for analyzing tire data, however, may in another embodiment operate to trigger a warning by assessing how much time remains ("time left") before the pressure in the tire will cross a critical low pressure limit. In such an embodiment, the function analyzes the rate of change of inflation pressure with respect to time. The purpose of the function is to first detect a rate of pressure loss. When the rate of pressure loss is significant enough to cause violation of the low pressure threshold in less than a specified time period, the driver is forewarned of an impending low pressure alarm. The nature of the early warning is to advise the driver of approximately how much time is left before the pressure trend will result in threshold violation. The early warning thereby allows time for the driver to exit the highway and to seek maintenance. The pressure trend advisory system consists of three sub-routines: 1. Differential Temperature Compensation; 2. Leak Rate Monitor; and 3. Trend Warning Algorithm.

Differential Temperature Compensation

Temperature compensation is applied to the raw pressure signal pursuant to the Ideal Gas Law in the manner discussed previously. Such a process removes the effect that changes in cavity temperature have on the tire inflation pressure after the vehicle starts and begins a current mission. The following temperature compensation formula may be used:

$$P = \frac{P * T_{ref}}{T} \quad \text{(Eq. 20)}$$

The reference temperature used for compensation may be the cavity temperature at system start (cold temperature). For those circumstances where the vehicle is stopped and the mission resumed with the tire temperature in an elevated state (i.e. above cold temperature), a default cold temperature may be used as the reference temperature. The default temperature may be based upon an estimation of the cold tire temperature or on a surrogate value such as the ambient air temperature. The compensated pressure is then passed to the leak rate monitor.

Leak Rate Monitor

The leak rate monitor identifies the rate of change of the input pressure with respect to the time. It monitors the temperature-corrected pressure available from the Differential Temperature Compensation algorithm and uses the time from start-up during a run and does a linear regression of pressure vs. time. The pressure intercept at zero time and the slope of the pressure vs. time or "leak rate" are estimated. The algorithm uses a recursive least squares filter (RLS) to update the parameter estimates at each sampled data point. The recursive algorithm eliminates the need to store large amounts of past data, thus improving memory usage. The algorithm also provides a filtered version of the pressure at each data point.

The leak rate monitor also includes two change detectors that allow the filter to adapt to sudden, large deviations of the sampled pressure from the filtered pressure. The change detectors accumulate differences in actual and filtered pressure values. When deviations exceed a threshold value, the initial conditions of the filter are reset. The reset action permits the filter to track a change in behavior. One change detector, by way of example, may adapt to pressure behavior change due to leakage and the other may adapt to dramatic pressure increase such as would occur when a tire is re-inflated at a filling station.

It should be noted that the change detectors reset the filter based upon the difference between whatever pressure measure is being used (as input to the filter) and the resulting output of the RLS filter. This is because the filter smoothes the value and the value may tend to keep on going in a particular direction determined by the intercept and slope parameters of the filter. However, when a sudden leak or deflation or a re-inflation (such as at a filling station) occurs, such an event causes the actual pressure to change (i.e. the mass of air within the tire cavity changes). At such an occurrence, it is desirable to immediately cause the filter to reflect the actual value more closely. The filter is then reset and starts the regression process over again from the actual value.

In the embodiments of the present invention, the input to the filter can be either the actual measured pressure or the temperature compensated pressure (i.e. compensated pressure value by the Ideal Gas Law). For the reasons discussed previously, use of a compensated pressure value as input to the filter is preferred but not necessary. The pressure subjected to thresholding in order to produce a warning can be:

1. the actual pressure;
2. the temperature compensated pressure from the Ideal Gas Law that compensates with either a) a fixed temperature; b) ambient temperature used as a reference;

3. the output of the RLS filter acting on either "1" or "2".

The scope of the invention is intended to allow for use of either the absolute pressure or a gauge pressure.

Various filtering algorithms may be utilized in order to extract trends from noisy data observations. According to one aspect of the invention, a recursive least squares (RLS) filter may be employed. The practice of regression known in the art involves the collection of large amounts of data and then performing the regression analysis ex post facto. Methods have been developed in the art that allow regression to update the model parameter estimates as each new data point is collected. These methods are termed "recursive". The regression model can then be updated in real time without keeping large amounts of data in computer storage. A Kalman filter may also be employed to estimate a linear relation between temperature adjusted pressure vs. time. The use of a Kalman filter, known to those in the art, is taught as a tool in creating virtual sensors of tire pressure and road friction in Gustafsson, F. (2001). Virtual Sensors of Tire Pressure and Road Friction. SAE International, incorporated herein by reference. Through the application of an appropriate filter, a linear approximation of the temperature-adjusted pressure may be obtained and the slope of the line represents the pressure change over time (leak rate).

Trend Warning Algorithm

The trend warning algorithm bases its warning on a "look ahead" assessment of how much time remains ("time left") intervals. A first caution warning is generated at a preset value (e.g. 60 minutes) "time left" or less. The warning state may appear, by example, as a yellow display on the dashboard. A second "time left" triggered at a lower threshold (e.g. 30 minutes) or less would be indicated by, for example, an orange display on the dashboard. Should the pressure reach a lower threshold limit, a critical warning indicator would be triggered.

The classification of pressure data points into "states" and a probability method for analyzing via fuzzy logic the state of highest probability have been previously explained in this document. Utilization of such a method serves to minimize false alarms. However, the invention and the use of the probability methods set forth above for "state" warning is not intended to be restricted solely to application to pressure data points. The probability and "state" classification method may be applied directly to the "time left" values if desired. For example, an additional method aspect of the invention is to compute a probability (or "proportion"; see below) of a number (e.g. 5–20) of data points that have been processed that are less than a "time left" threshold. A warning signal may be generated when the proportion exceeds a certain probability threshold value. The probability threshold value may be determined through trial and error or by analyzing mean and standard deviation of the values of "time left" and applying probability distributions and laws in order to establish an acceptable probability value. As used herein, "proportion" may be substituted for the term "probability". That is, the proportion of data points having calculated time left values that fall within the category "less than time left" may be used and compared against a threshold proportion value. Therefore, the term "probability means" is intended to encompass either use of probability values or use of proportion values.

The "time left" before crossing a threshold value may be determined for each data point measured (gauge pressure or temperature compensated pressure value) and the data points then processed into two states; {greater than the "time left" threshold} and {less than the "time left" threshold}. Such a process can be represented efficiently by {0,1} binary numbers and implemented efficiently in a microprocessor. Accordingly, a further enhanced aspect of the subject method would be to process a finite number of most recent "time left" data points into one of two states; assign values of 0 or 1 to the two states respectively; store the 0 and 1 in a computer memory; compute the proportion of the total number of points that are in the state that represents values that are less than the "time left" threshold; and generate a warning signal when the proportion or probability exceeds a predetermined probability or proportion threshold value or values.

Additionally, as explained previously, a pressure-temperature map is developed to establish a pressure limit in order to alert the driver. A further advanced aspect of the invention is to utilize the map concept in reference to temperature. Such an application of the method would include the steps of determining a pressure temperature map based upon the detected data points and separated by multiple boundaries as defined by the Ideal Gas Law; establishing the maximum temperature over a range of operating speeds and loads at each "boundary"; forming a characteristic curve from the maximum temperatures along each boundary; establishing a limiting temperature threshold on the characteristic curve; and generating a signal when a temperature exceeds the temperature threshold.

Further variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of measuring an undesired pressure drop in a tire of a vehicle and generating a warning signal responsive thereto, comprising the steps of:

establishing a reference temperature;

determining at least one pressure warning threshold at the reference temperature;

measuring gauge pressure and gauge temperature within a tire cavity;

correcting the gauge pressure to a corrected pressure value at the reference temperature;

calculating from a series of corrected gauge pressure measurements a leak rate;

comparing the corrected pressure value at the calculated leak rate against the pressure warning threshold;

generating a warning signal based upon the comparison of the corrected pressure value at the calculated leak rate against the pressure warning threshold.

2. A method according to claim 1, further comprising:

taking at least a second measurement of gauge pressure and gauge temperature within the tire cavity;

correcting the second measured gauge pressure to a second corrected pressure value at the reference temperature;

determining an estimated corrected pressure value by averaging the first and second filtered pressure values.

3. A method according to claim 2, wherein the estimated corrected pressure value represents an exponential average of the first and second corrected pressure values.

4. A method according to claim 1, further comprising:
measuring successive sample data points of pressure and temperature within a tire cavity;
determining a characteristic curve of pressure to differential temperature based upon the successive data points;
calculating a slope of a boundary of the characteristic curve;
determining a zero intercept value of the characteristic curve representing a reference pressure value at the reference temperature.

5. A method according to claim 4, further comprising:
adjusting the boundary of the characteristic curve to compensate for measurement error.

6. A method according to claim 1, further comprising:
making at least a second measurement of gauge pressure and gauge temperature within the tire cavity;
correcting the second measured gauge pressure to a second corrected pressure value at the reference temperature;
determining the leak rate based upon the change between the first and second corrected pressure values;
predicting based upon the leak rate the anticipated time that the corrected pressure value of the tire will cross the pressure warning threshold;
generating a warning signal indicative of the anticipated time.

7. A method according to claim 6, further comprising:
establishing a time left threshold on the value of anticipated time at which the corrected pressure value will cross the low pressure warning threshold;
determining whether the anticipated time is less than the threshold; and
generating a warning signal when the anticipated time is less than the threshold.

8. A method of measuring an undesired pressure drop in a tire of a vehicle and generating a warning signal responsive thereto, comprising the steps of:
establishing a reference temperature;
determining at least one pressure warning threshold at the reference temperature;
measuring gauge pressure and gauge temperature within a tire cavity;
correcting the gauge pressure to a filtered pressure value at the reference temperature;
comparing the filtered pressure value against the pressure warning threshold;
generating a warning signal upon an undesired pressure drop in the tire;
establishing a time left threshold on the value of anticipated time at which the filtered pressure value will cross the low pressure warning threshold;
determining whether the anticipated time is less than the threshold;
generating a warning signal when the anticipated time is less than the threshold;
developing data points from a series of successive measurements of pressure and temperature;
establishing a probability threshold value;
computing a time left probability based upon a plurality of recent said data points;
comparing the time left probability against the probability threshold value; and
generating a warning signal when the time left probability exceeds the probability threshold value.

9. A method of measuring an undesired pressure drop in a tire of a vehicle and generating a warning signal responsive thereto, comprising the steps of:
establishing a reference temperature;
determining at least one pressure warning threshold at the reference temperature;
measuring gauge pressure and gauge temperature within a tire cavity;
correcting the gauge pressure to a filtered pressure value at the reference temperature;
comparing the filtered pressure value against the pressure warning threshold;
generating a warning signal upon an undesired pressure drop in the tire;
developing data points from a series of successive measurements of gauge pressure and gauge temperature;
determining a pressure-temperature map based upon the data points and separated by boundaries defined by the Ideal Gas Law;
classifying each data point into a one of a plurality of states;
calculating state probabilities for each data point;
forming a vector of probabilities for each data point;
determining a current state vector representing an average of the vector of probabilities of each data point in the series of successive measurements;
identifying a state with a maximum probability; and
reporting the state of maximum probability.

10. A method according to claim 9, wherein the plurality of states are classified as acceptable, cautionary, and unacceptable.

11. A method of identifying a leak rate in a tire of a vehicle, comprising the steps of:
establishing a reference temperature;
taking a finite number of sample data points of gauge pressure and gauge temperature within a tire cavity;
compensating the measured pressure data into filtered pressure values at the reference temperature;
applying a recursive linear least squares regression filter to the pressure data to estimate a pressure leak rate.

12. A method of identifying a leak rate in a tire of a vehicle, comprising the steps of:
establishing a reference temperature;
taking a finite number of sample data points of gauge pressure and gauge temperature within a tire cavity;
compensating the measured pressure data into filtered pressure values at the reference temperature;
applying a recursive linear least squares regression filter to the pressure data to estimate a pressure leak rate and wherein the measured pressure data is compensated into filtered pressure values at the reference temperature utilizing the Ideal Gas Law.

13. A method according to claim 12, wherein the reference temperature is the first temperature measured in the cavity of a system start up.

14. A method according to claim 13, wherein the reference temperature is the ambient temperature.

15. A method of monitoring tire air pressure in a rolling vehicle, comprising:
recording measured data pairs comprising values for pressure and temperature;

determining a characteristic curve for the measured data pairs;

determining filtered pressure values of the data pairs at a reference temperature utilizing the Ideal Gas Law;

comparing the filtered pressure values of the data pairs against at least one pressure threshold value; and determining a zero intercept offset value corresponding to a measurement error factor.

16. A method of monitoring tire air pressure in a rolling vehicle, comprising:

recording measured data pairs comprising values for pressure and temperature;

determining a characteristic curve for the measured data pairs;

determining filtered pressure values of the data pairs at a reference temperature utilizing the Ideal Gas Law;

comparing the filtered pressure values of the data pairs against at least one pressure threshold value; and determining a pressure leak rate based upon the measured data pairs.

17. A method according to claim 16, further comprising:

applying a change detector to reset the leak rate filter in the event that the leak rate undergoes a substantial change.

18. A method of monitoring tire air pressure in a rolling vehicle, comprising:

recording measured data pairs comprising values for pressure and temperature;

determining a characteristic curve for the measured data pairs;

determining filtered pressure values of the data pairs at a reference temperature utilizing the Ideal Gas Law;

comparing the filtered pressure values of the data pairs against at least one pressure threshold value;

classifying each measured data pair into one of a plurality of states; and calculating state probabilities for each measured data pair by means of a fuzzy logic.

19. A method according to claim 18, further comprising:

forming a vector of probabilities for each measured data pair;

determining a current state vector representing an average of the vector of probabilities of each measured data pair in a finite series of successive measurements;

identifying a state with a maximum probability; and reporting the state of maximum probability.

* * * * *